United States Patent [19]

Barrett et al.

[11] 4,305,199
[45] Dec. 15, 1981

[54] APPARATUS FOR CONTROLLING THE LENGTH OF WEDGES

[75] Inventors: Eugene R. Barrett, Columbia City; Larry W. Straley, Fort Wayne, both of Ind.

[73] Assignee: General Electric Company, Fort Wayne, Ind.

[21] Appl. No.: 128,095

[22] Filed: Mar. 7, 1980

[51] Int. Cl.³ .......................................... H02K 15/10
[52] U.S. Cl. ................................ 29/564.6; 29/564.8; 29/734; 493/360
[58] Field of Search ................ 29/564.1, 564.6, 564.7, 29/564.8, 596, 734, 736, 564.2; 493/360

[56] References Cited

U.S. PATENT DOCUMENTS

| | | |
|---|---|---|
| 3,324,536 | 6/1967 | Hill . |
| 3,447,225 | 6/1969 | Eminger . |
| 3,579,818 | 5/1971 | Arnold et al. . |
| 3,758,937 | 9/1973 | Ott . |
| 3,805,357 | 4/1974 | Peters . |
| 3,829,953 | 8/1974 | Laver et al. . |
| 3,831,255 | 8/1974 | Smith et al. . |
| 3,872,568 | 8/1975 | Morr . |
| 3,909,902 | 10/1975 | Peters . |
| 4,136,433 | 1/1979 | Copeland et al. . |
| 4,233,728 | 11/1980 | Pieper ................................ 29/596 |
| 4,233,729 | 11/1980 | Koenig ................................ 29/596 |

OTHER PUBLICATIONS

MPC Publication S/N 8-3652-1.

*Primary Examiner*—William R. Briggs
*Attorney, Agent, or Firm*—Ralph E. Krisher, Jr.

[57] ABSTRACT

The application discloses new modes of changing the length of pinch roller fed wedge material that involves transmitting motive power from a power shaft to a driven pinch roller through a power train that includes at least one pivoting lever, the effective length of which is quickly changed by moving a pivot shaft which supports such lever. Power is supplied through a first link from a main drive shaft to a pivoting slider, and then to a rocker arm or a lever which rocks about a pre-selected pivot point. Power is transmitted from such lever to a rack or other driving mechanism which then supplies motive power to a pinch wheel assembly. The pivot for the previously mentioned rocker arm is adjustable, and thereby the relative effective lengths of the rocker arm on either side of the pivot may be selectively varied in order to change the extent of rotary movement of the driven pinch roller even though the first drive link continues to travel along a fixed path.

4 Claims, 2 Drawing Figures

APPARATUS FOR CONTROLLING THE LENGTH OF WEDGES

CROSS-REFERENCE TO RELATED APPLICATIONS

The subject matter of this application is related to the subject matter of Application Ser. No. 964,075 which is assigned to the same assignee as this application and which was filed on Nov. 27, 1978 in the name of Louis W. Pieper; and also to the subject matter of Application Ser. No. 964,076 which is assigned to the same assignee as this application, and which was filed on Nov. 27, 1978 in the name of Fredrick Koenig. The entire disclosures of each of the just referenced applications are specifically incorporated herein by reference.

BACKGROUND OF THE INVENTION

The present invention relates generally to apparatus for making slot closure wedges for magnetic stator cores of dynamo-electric machines at a station where coils and wedges are axially injected into axial slots of such cores; and more particularly to apparatus for controlling the length of such wedges where such wedges are formed into a desired shape by rollers and fed by pinch roller action to a wedge cutting mechanism.

Numerous patents in the art illustrate methods and apparatus wherein wedges are made in a wedgemaker, placed in a wedge magazine disposed generally collinearly with axially extending coil injection blades or tools, and wherein the wedges subsequently are inserted axially into stator core slots along the trailing ends of stator coils that are also being axially inserted into such slots. The wedges then lie between adjacent side-turn portions of different winding phases, or sometimes lie adjacent to the bore of the stator and overlie the side-turn portions of the last to be inserted winding phase. When the wedges are adjacent to the bore of the stator, they effectively "close" such slots. A number of prior patents related to the type of apparatus just generally described are referred to and discussed in the above identified copending applications of Pieper and Koenig.

The Pieper and Koenig applications themselves relate, inter alia, to improvements in equipment wherein the shape of wedges is determined by a rolling action and the wedge material is fed by the operation of pinch feedrollers.

The equipment illustrated in the herein above referenced Pieper application and Koenig application is capable of feeding different pre-determined lengths of wedge material so that wedges of different pre-determined lengths may be provided. However, in both the Pieper and Koenig equipment, before the wedge length can be changed; it is necessary to stop the equipment, loosen a wrist pin, adjust a screw so as to change the affective "crank arm" of a slider mechanism at a drive cam assembly; and thereafter retighten the wrist pin to prevent slippage between the end of the main drive rod and the input of an unidirectional clutch. Moreover, when adjustments have been made as just described in the Koenig and Pieper equipment, it is necessary to actually check the length of wedges produced after an adjustment has been made, and then perhaps repeat the adjustment procedure in order to "fine tune" the relative positions of the adjusted parts before a pre-determined length of wedge having dimensions within an acceptable tolerance can be produced.

It would be desirable to improve the Koenig equipment and the Pieper equipment (discussed in the above incorporated by reference applications) so that changes in wedge length may be affected without requiring the manual manipulation or adjustment of adjusting and lock screws. Moreover, it would be even more desirable to be able to provide means and methods whereby equipment basically similar to that of Koenig and that of Pieper could be adjusted to provide wedges of different pre-determined lengths while the equipment continues to be energized. In addition, it would be desirable to provide new and improved apparatus whereby equipment of the basic type shown in the above referenced Koenig application and the above referenced Pieper application could be automatically adjusted to provide wedges of different pre-determined lengths.

SUMMARY OF THE INVENTION

Accordingly, a general object of the present invention is to provide new and improved apparatus of the rolled wedgemaker type, wherein the length of the wedges produced by the equipment could be changed as desired in a minimum amount of time, and while requiring that no more than a minimum number of parts be moved relative one to another; and particularly wherein fine tuning of adjustments made to the apparatus may be carried out quickly so that the overall set-up time involved in setting up the equipment to produce wedges of different pre-determined lengths can be kept to an absolute minimum.

A more particular object of the present invention is to provide new and improved apparatus for changing the feed length of pinch roller fed wedge material by changing the location of a pivot shaft in a drive train at a point remote from a power input shaft and also remote from pinch rollers.

A more specific object of the present invention is to provide new and improved apparatus for changing the length of pinch roller fed wedge material by adjustably controlling the relative length of two lever arms which transmit power being transmitted from a main drive shaft to a driven pinch roller.

In carrying out the above and other objects of the present invention, we provide new and improved modes of changing the length of pinch roller fed wedge material that involves transmitting motive power from a power shaft to a driven pinch roller through a power train that includes at least one pivoting lever, the effective length of which may be quickly changed by moving a pivot shaft which supports such lever.

In a specific form of apparatus, power is supplied through a first link from a main drive shaft to a pivoting slider, and thence to a rocker arm or a lever which rocks about a pre-selected pivot point. Power is transmitted from such lever to a rack or other driving mechanism which then supplies motive power to a pinch wheel assembly. The pivot for the previously mentioned rocker arm is adjustable, and thereby the relative effective lengths of the rocker arm on either side of the pivot may be selectively varied in order to change the extent of rotary movement of the driven pinch roller even though the first drive link continues to travel along a fixed path.

The subject matter which we regard as our invention is particularly pointed out and distinctly claimed in the concluding portion of this specification. The invention itself, however, taken with further objects and advantages thereof, may be best understood by reference to the following description taken in conjunction with the accompanying drawings wherein like reference numerals have been utilized to denote like parts.

DESCRIPTION OF THE PREFERRED EMBODIMENT

Figure 1:
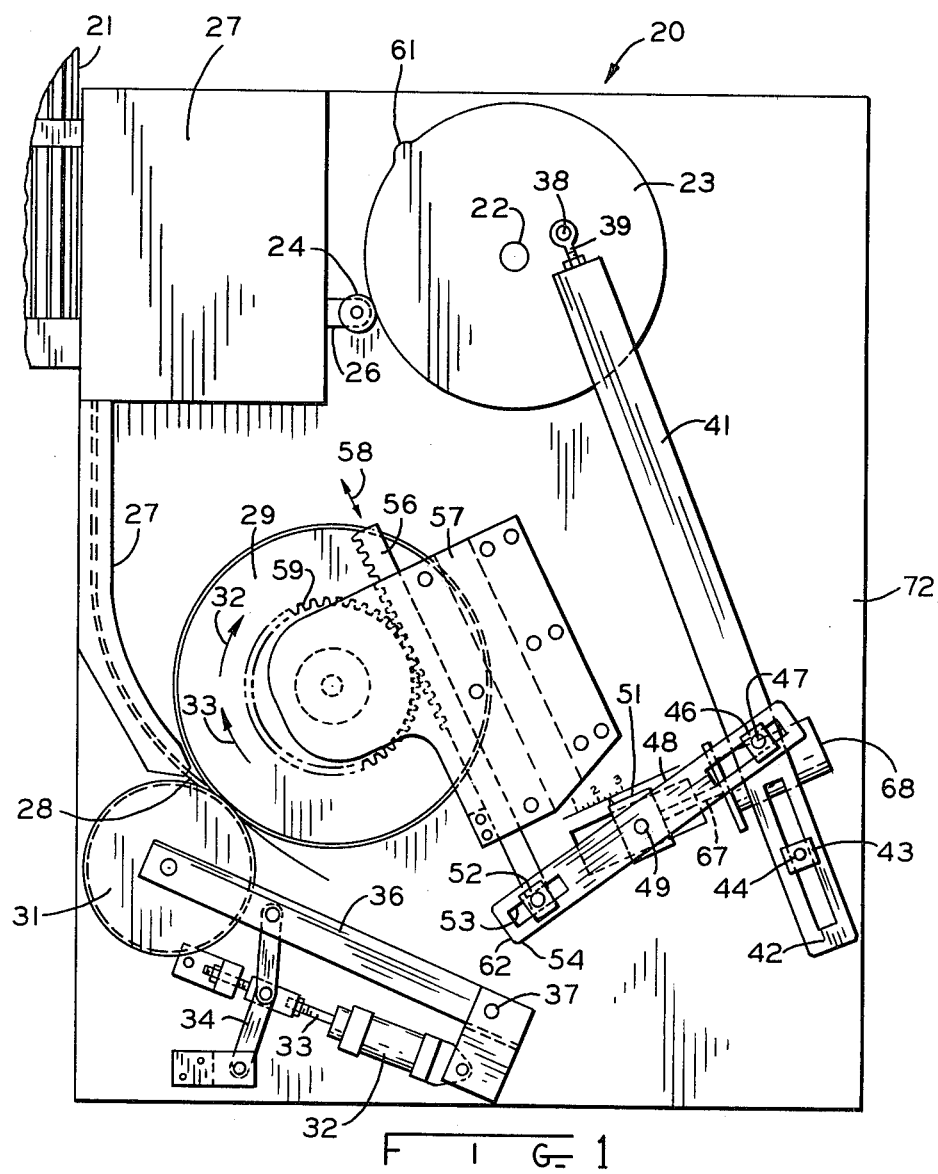
FIG. 1 is a side elevation, with parts removed and parts broken away, of a wedgemaking and wedge and coil injection machine particularly adapted for use in the manufacture of dynamo-electric machine stators.

Referring now to the drawings, and particularly to FIG. 1, a multi-function machine 20 has been illustrated which is a wedgemaking and wedge and coil injection machine of the type shown in the above referenced Koenig application and also in the above referenced Pieper application. More details of this type of injection machine are presented in Lauer et al U.S. Pat. No. 3,829,953; and Hill U.S. Pat. No. 3,324,536, to name but a few. For clarity in illustration, portions of the apparatus 20 not necessary for an understanding of the present improvement therein have been omitted, but the relationship of the structure actually shown in FIGS. 1 and 2 hereof to the not shown parts of apparatus 20 can be readily appreciated by comparing the structure shown in FIGS. 1 and 2 hereof with the disclosures in the above referenced Koenig and Pieper applications as well as the above referenced patents.

The parts of apparatus 20 that are illustrated in FIG. 1 include a wedge magazine 21, a main drive shaft 22, a primary drive cam 23, and a cam follower portion 24 of a wedge material cut-off device 26. Details of the wedge material cut-off device 26 and a pusher for loading wedges into the magazine 21 are hidden from view in FIG. 21 by a plate 27; but full details of the mechanisms utilized for severing wedge material, placing severed wedge material into magazine 21, and indexing magazine 21 are included in the incorporated-by-reference applications of Pieper and Koenig. Persons having a knowledge of the Koenig application and Pieper application will understand that rolled wedge material is intermittently fed along the guide track 27 to the wedge material severing and transfer devices hidden from view by plate 27. The wedge material, denoted by the reference numeral 28 in FIG. 1, is interfed from the pinch wheel pair 29, 31 as the pinch or feed roller 29 is intermittently driven in a direction indicated by the intermittent arrows 32, 33. As will be understood by such persons, material is fed by wheel or roller 29 only so long as pinch wheel 31 is urged thereagainst because of the extension of cylinder 32, and when cylinder 32 retracts its rod 33, the toggle linkage 34 will close or collapse and swing roller 31 away from roller 29 by causing the arm 36 (which carries roller 31) to pivot about a pivot pin 37 which is carried by the main frame 72 of the apparatus 20.

It also will be understood by persons of ordinary skill in the art and who have availed themselves of the above referenced Koenig and Pieper applications, that the roller 29 is actually driven through an unidirectional clutch and that a braking means is utilized to prevent inadvertent reverse movement of the wheel 29 in a direction opposite to the direction of arrows 32, 33.

Continued rotation of shaft 22 (and cam 23 locked for rotation therewith) causes drive pin 38 carried by cam 23 to move in a circular path about the axis of main drive shaft 22. An eyebolt 39 is fastened by means of a bushing to the drive pin 38 and thus also moves about the axis of shaft 22. A main drive link 41 is fastened to the eyebolt 39, but the movement of end 42 (in response to rotation of shaft 22) of main drive link 41 is limited to the movement permitted by a slider block 43 which is free to undergo only rotary movement about a pivot 44 which mounts the block 43 to the main frame 72 of the machine 20. Thus, the end 42 of the main drive link or arm 41 slides along the slider block 43 and also pivots as the slider block 43 pivots about its pivot pin 44.

The arm or link 41 has either a roller bushing or a rotatable slider affixed thereto by means of a pivot pin 47; and the reciprocatory rocking movement of link 41 will impart a corresponding rocking movement to an intermediate power transfer arm or lever 48 which is constrained to simply pivot about a pivot 49 which is carried on a slider block 51. During normal operation, while wedges of the same pre-determined length are being produced by the apparatus 20, the slider block 51 remains in a fixed position and so the location of pivot 49 is fixed. Accordingly, the motion imparted to lever 48 by the roller bushing or slider 46 will cause a relatively constant proportional amount of movement of a roller bushing or rotatable slider 52 that is trapped in a slot 53 in the end 54 of the lever 48; and thus a simple straight line reciprocatory motion is imparted to the rack 56 (to which the roller bushing or slider 52 is fastened). The rack 56 is guided by tracks in the plate 57, so that the rack will undergo only straight line reciprocatory movement as indicated by the arrow 58. The teeth of the rack 56 engage a gear 59 and thus impart alternating rotary motion to the gear 59. The gear 59 in turn is coupled to the input of a one way or unidirectional clutch as described in complete detail in the above referenced Koenig and Pieper applications. Thus, downward movement of rack 56 (as viewed in FIG. 1) will cause the feed or pinch wheel 29 to move in the direction of arrow 32, but generally upward movement of the rack 56 (as viewed in FIG. 1) will not be accompanied by any corresponding movement of the pinch wheel 29.

As will be understood from a review of the Pieper and Koenig applications, during the portion of the revolution of shaft 22 that pinch wheel 29 is dwelling (i.e., during that part of a drive revolution during which the rack 56 is moving upwardly as viewed in FIG. 1) the cam follower 24 will be driven downwardly by the lobe 61 of the cam 23, and previously fed wedge material will be severed from the material being fed along the rack 27.

When it is desirable to provide longer wedges, it will be understood that pinch wheel 29 will be driven through a larger angle for each revolution of shaft 22. This may be accomplished with the mechanism shown in FIG. 1 by causing the rack 56 to travel with a longer excursion for each stroke of the drive arm 41. Longer excursions of the rack 56 in turn can be accomplished by effectively lengthening the distance between pivot point 49 and the center of roller bushing or slider 52 in comparison with the distance between the center pivot 49 and the center of pivot pin 47. This is accomplished with the mechanism shown in FIG. 1 by moving the slider block 51 upwardly and to the right (as viewed in FIG. 1) which has the effect of relatively moving the roller bushing 52 towards the end of the lever 48. This motion of slider 51 also has the effect of relatively moving the pivots 49 and pin 47 closer to one another. Thus, simply by moving the slider 51, the amount of stroke of rack 56 may be varied even though lever 41 always undergoes the same motion under the influence of cam 23.

Figure 2:
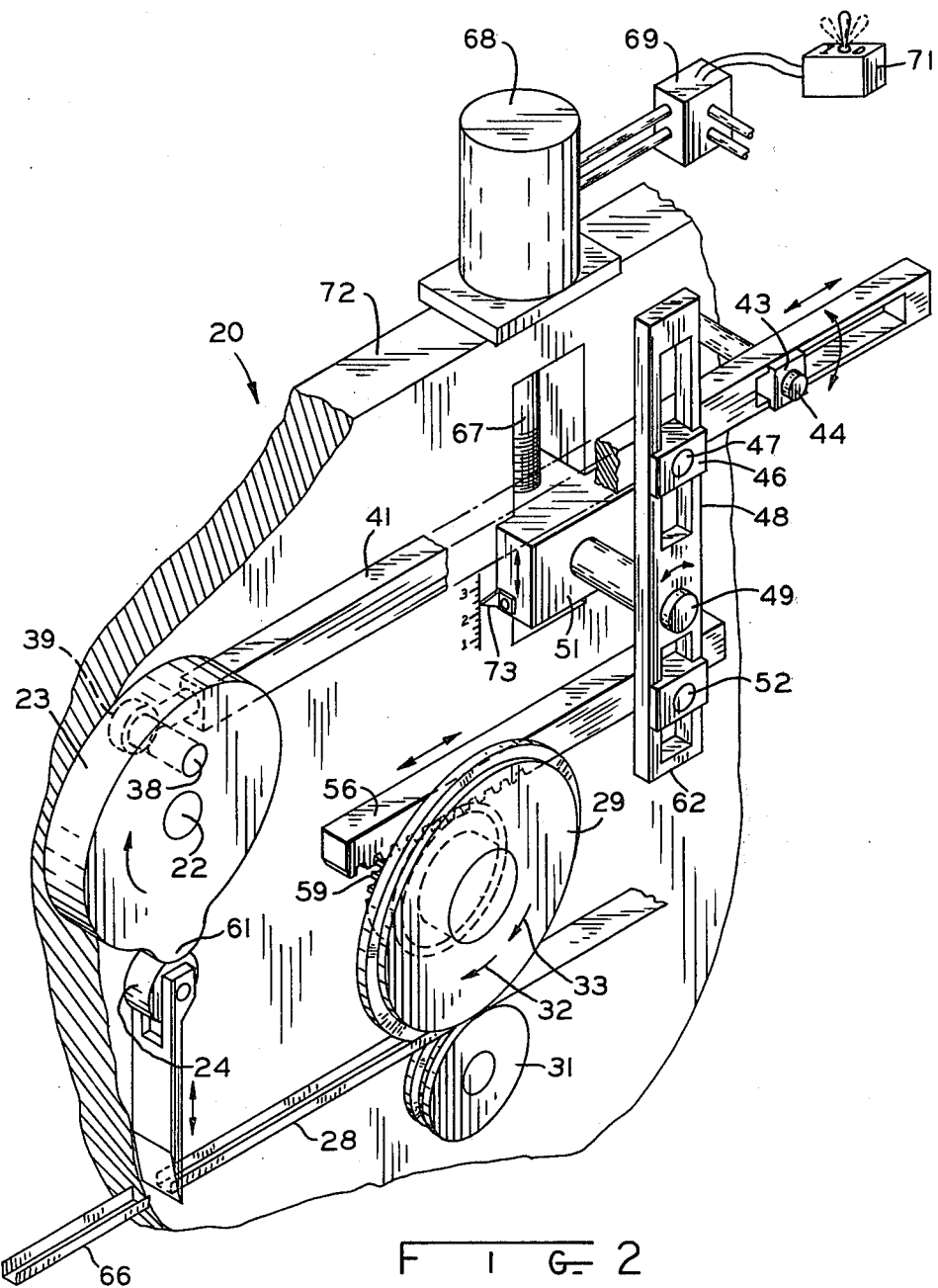
FIG. 2 is a schematic mechanical view of some of the parts shown in FIG. 1.

The essential mechanism parts shown in FIG. 1, and thus far described, have also been shown in schematic form in FIG. 2. Although somewhat different mechanical elements have been used in the schematic of FIG. 2, the same reference numerals have been applied thereto which were used for the functionally corresponding parts illustrated in FIG. 1.

In FIG. 2, the parts shown therein are oriented uniformly at approximately 90° from the orientations and positions thereof shown in FIG. 1. Thus, if the structure of FIG. 2 is viewed from the right-hand side of the drawing, the parts shown therein will have roughly the same orientation as the corresponding parts shown in FIG. 1.

With continued reference to FIG. 2, it will be understood that the rotary motion of shaft 22 and cam 23 imparts a reciprocating motion to the link 41, which is free to slide along the slider block 43 and pivot about pivot 44. Movement of link 41 in turn causes movement of the slider block 46 (or roller bushing as the case may be) which block 46 is free to pivot about pin 47. Thus, one rotation of drive shaft 22 will cause on reciprocation or rocking movement of the lever 48 about its pivot 49 under the influence of slider 46. As the lever 48 rocks, it in turn causes one reciprocation of the rack 56 and, due to the inter-engagement of the teeth on rack 56 with the gear 59, rotary motion is imparted to the gear 59. As previously mentioned, the gear 59 is coupled with the pinch wheel or roller 29 through a one-way clutch and thus pinch wheel 29 moves only in one direction even though rack 56 reciprocates back and forth. When it is desired to increase the length of a wedge 66, i.e., increase the amount of angular movement of pinch wheel 29 for one revolution of shaft 22, the adjustable pivot shaft 49, as viewed in FIG. 2, will be elevated (moved upwardly and to the right as shown in FIG. 1). This movement of shaft 49 is accomplished by turning a mounting screw 67 which is threaded thereinto so as to move the slider block 51. When this is done, the length of the lever arm between pivot 49 and pivot 47 is effectively diminished, while the length of the lever arm between pivot 49 and pivot 52 is effectively increased.

Alternatively, when the length of the wedge 66 is to be reduced, the screw 67 will be turned in a direction such that the pivot 49 will be lowered as viewed in FIG. 2 (move downardly and to the left as viewed in FIG. 1). The threaded rod 67 is either coupled to or formed from the output shaft of any suitable reversible motor, such as hydraulic motor 68. The motor 68 is connected with hydraulic lines (see FIG. 2) by means of a self-centering double solenoid valve 69 which may be controlled by a manual selector switch 71. The manual selector switch 71 may take any desired form and, for example, may include a three position (center off) toggle lever which can be moved to one dotted line position thereof (shown in FIG. 2) in order to increase the length of wedges, moved to a second dotted line position thereof in order to decrease the length of the wedges. As will be understood, the selector switch will actuate the solenoid valve 59 so as to cause the motor 68 to turn either clockwise or counter-clockwise (depending upon the direction in which the manual switch is thrown).

It should now be appreciated that the motor 68 is mounted to a portion of the main frame of the apparatus 20, (such portion being denoted by the reference numeral 72). Moreover, it should be appreciated that it is a simple matter to actuate the selector switch 71 while the shaft 22 continues to rotate, and to compare the length of wedges 66 being produced by the equipment with a pre-determined standard length whenever it is desired to change the length of wedges being produced by the equipment. Alternatively, the apparatus 20 may be calibrated and a pointer 73 may be fixed to the slider 51. In addition, indicia represented by the scale carrying the reference numbers 1, 2, 3 may be provided on the machine frame. A set-up person can then actuate the selector switch and move the slider 51 until the pointer carried thereby lines up with a desired number indicating the length (in inches, millimeters, etc.) desired for wedges to be produced by the equipment 20.

It will now be understood that we have disclosed new and improved methods for changing the length of wedges for dynamo-electric machines (e.g., fractional horsepower motors) that involves: transforming rotary motion to reciprocating rocking, reciprocating, and rotary motion; and changing the relative location of at least one pivot point in the drive train in order to produce variable amounts of rotary motion outputs for a given fixed rotary motion input. It also should be understood that we have provided new and improved mechanisms for carrying out our preferred methods. Accordingly, while the present invention has been explained by describing preferred embodiments thereof it will be apparent that many modifications may be made when putting the invention into practice without departing from the spirit of the invention. It is therefore intended to cover all such equivalent variations as come within the scope of the appended claims.

What we claim as new and desire to secure by Letters Patent of the United States is:

1. In a multifunction stator wedgemaking and inserting and stator winding injecting apparatus having means for moving a strip of wedge material adjacent to wedge material severing means, magazine means for receiving wedges severed from the strip of wedge material, and means for moving severed wedges into the magazine means; wherein the means for moving a strip of wedge material comprises pinch wheel means for feeding wedge material to said severing means; and the apparatus includes a mechanism for controlling the operation of the pinch wheel means and for supplying power to the pinch wheel means from a main drive shaft; the improvement wherein: said mechanism for controlling includes an intermediate link, a final link, and a main drive link coupled with said main drive shaft and also coupled with the intermediate link; said intermediate link being movable about a pivot; said final link being coupled with said pinch wheel means; means for establishing the intermediate link pivot; and means for selectively moving the means for establishing the intermediate link pivot, whereby a fixed movement of the main drive link may be selectively transmitted as different movements of the final link in response to the selective movement of the means for establishing the intermediate link pivot.

2. The apparatus of claim 1 wherein the intermediate link comprises an arm pivotally supported along the central portion thereof and having means at the ends thereof for permitting sliding and pivotal coupling with the main drive link and final link; and the main drive link is pivotally and slidably supported by the frame of the apparatus and is pivotally and slidably coupled with said arm.

3. The apparatus of claim 2 wherein the final link is a rack supported for reciprocating linear movement relative to the frame of the apparatus, and the final link is pivotally and slidably coupled with said arm.

4. The apparatus of claim 3 wherein the effective lever arms between the pivot of said arm and the point of coupling with said rack and said main drive link respectively vary proportionately for different settings of the means for establishing the intermediate link pivot.

* * * * *